United States Patent [19]
Yokota

[11] Patent Number: 4,639,837
[45] Date of Patent: Jan. 27, 1987

[54] ILLUMINATING OPTICAL SYSTEM FOR HIGH MAGNIFICATION ENDOSCOPES

[75] Inventor: Akira Yokota, Hachiouji, Japan

[73] Assignee: Olympus Optical Co., Ltd., Tokyo, Japan

[21] Appl. No.: 717,093

[22] Filed: Mar. 28, 1985

[30] Foreign Application Priority Data

Mar. 29, 1984 [JP] Japan ................... 59-061768

[51] Int. Cl.⁴ .............................................. F21V 7/04
[52] U.S. Cl. ............................. 362/32; 350/96.26; 128/6
[58] Field of Search ............ 350/96.26, 286, 287, 350/574, 527, 506; 362/32; 128/6

[56] References Cited

U.S. PATENT DOCUMENTS 4,354,734 10/1982 Nakahashi ............ 350/96.26
4,403,273 9/1983 Nishioka ................ 362/32
4,500,181 2/1985 Takahashi ............... 362/32

FOREIGN PATENT DOCUMENTS 43-12107 5/1968 Japan .
50-14276 2/1975 Japan .
58-10033 1/1983 Japan .

*Primary Examiner*—James C. Yeung
*Attorney, Agent, or Firm*—Cushman, Darby & Cushman

[57] ABSTRACT

An illuminating optical system for high magnification endoscopes wherein, in order that a sufficient light amount may be secured and no flare light may enter an observing system, a light guide is annularly arranged as tapered around the observing optical system so that the optical axis of a light emitted from the light guide may intersect the optical axis of the observing optical system at an object point and a cover glass is provided with a stop.

9 Claims, 5 Drawing Figures

ILLUMINATING OPTICAL SYSTEM FOR HIGH MAGNIFICATION ENDOSCOPES

BACKGROUND OF THE INVENTION (a) Field of the Invention

This invention relates to an illuminating optical system for high magnification endoscopes.

(b) Description of the Prior Art

In an endoscope of a high magnification, the object point is so close and the range to be observed is so small that, in order to secure a flat illumination, the optical axis of the illuminating optical system and the optical axis of the observing optical system must coincide with each other or must intersect each other at an object point.

FIG. 1 shows an endoscope illuminating optical system mentioned in Japanese utility model laid-open No. 14276/1975 as an example in which the optical axis of the illuminating optical system and the optical axis of the observing optical system are made to coincide with each other. In the case of this example, in the observing optical system, the light starting from the object point P will pass through the cover glass 1, the stop 3 provided in the reflecting plate 2 and the objective lens 4 to form an image at the end of the image guide 5. On the other hand, in the illuminating optical system, the reflecting plate 2 is inclined by 45 degrees to the optical axis of the observing optical system so that the light emitted from the exit end of the light guide 6 will have its optical axis coincided with the optical axis of the observing optical system and will pass through the cover glass 1 to illuminate the object point P. The illuminated range A can well cover the observed range B. However, in this example, there have been problems that the distance from the exit end of the light guide 6 to the object point P is so long that no sufficient illuminating light amount can be obtained and, as the flare light generated on the surface of the cover glass 1 is to be seen directly in the observing system, no clear image can be obtained.

FIG. 2 shows an endoscope illuminating optical system mentioned in Japanese patent publication No. 12107/1968 as another example in which the optical axis of the illuminating optical system and the optical axis of the observing optical system are made to coincide with each other. In the case of this example, in the observing optical system, the eyepiece 7 is arranged in the rear of the rear end of the curved image guide 5 so that the light starting from the object M will enter the front end of the image guide 5 through the objective lens 4, will pass through the image guide 5 and will come out of its rear end to be observed through the eyepiece 7. On the other hand, in the illuminating optical system, the adaptor 8 of the same material as of the glass coating fibers of the image guide 5 is provided in the bent part 5a of the image guide 5 so that the light starting from the light source 9 will pass through the condenser lens 10, will enter the bent part 5a through the adaptor 8, will have its optical axis coincided with the optical axis of the observing optical system when the light comes out of the front end of the image guide 5 and will pass through the objective lens 4 to illuminate the object M. In this example, there have been problems that, as the distance from the front end of the image guide 5 to the object M is comparatively shorter and the objective lens 4 is located between them, the light amount can be secured by adjusting the light source 9 but the flare light occurred on the surface of the objective lens 4 is to be seen directly in the observing system and no clear image can be obtained. Also, it has not been practical as a form to arrange such illuminating system in the course of the image guide 5.

FIG. 3 shows an endoscope illuminating optical system mentioned in Japanese patent laid-open No. 10033/1983 as an example in which the optical axis of the illuminating optical system and the optical axis of the observing optical system are intersected with each other. In the case of this example, the cover glass 1 has a reflecting surface 1a located in front of the light guide 6, an objective lens side surface 1b intersecting rectangularly with the optical axis of the objective lens 4 and facing the objective lens 4 and an object side surface 1c parallel with said surface 1b and exposed to the front face of the tip part of the endscope so that the illuminating light emitted from the light guide 6 will be reflected by the reflecting surface 1a, will be then totally reflected by the objective lens side surface 1b and will intersect that optical axis (of the observing optical system) of the objective lens 4 on the object side surface 1c. If the medium in contact with the object side surface 1c of the cover glass 1 is air, the light will not permeate out but, in case the tip part of the endoscope is adjacent close to the object, the medium in contact with the object side surface 1c will be water, for example, within a human body and therefore a light will be passed through the object side surface 1c. Therefore, in this example, there is the advantage that the flare lights produced on the surfaces of the cover glass 1 and the objective lens 4 do not enter into the observation range. However, there have been the problems that, as the illuminating light is reflected twice before it reaches the object point, the light path length becomes greater, and the loss of light by Fresnel's reflection amounts to about 16%, so that the amount of light becomes insufficient.

This and other objects of the present invention will become more apparent during the course of the following detailed description and appended claims.

SUMMARY OF THE INVENTION

A primary object of the present invention is to provide an illuminating optical system for high magnification endoscopes wherein the light amount can be well secured with only the light passing through the light guide and no flare light enters the observing system.

According to the present invention, this object is attained by a formation wherein a light guide is annularly arranged as tapered around the observing optical system so that the optical axis of a light emitted out of it may pass through an air space and cover glass and intersect the optical axis of the observing optical system at an object point and the exit end of the light guide is arranged as adjacently as possible to the object point.

According to the preferred formation of the present invention, a stop is provided on the objective side of or within the cover glass so that no flare light may enter the observing optical system.

DESCRIPTION OF THE PREFERRED EMBODIMENTS

Figure 4:
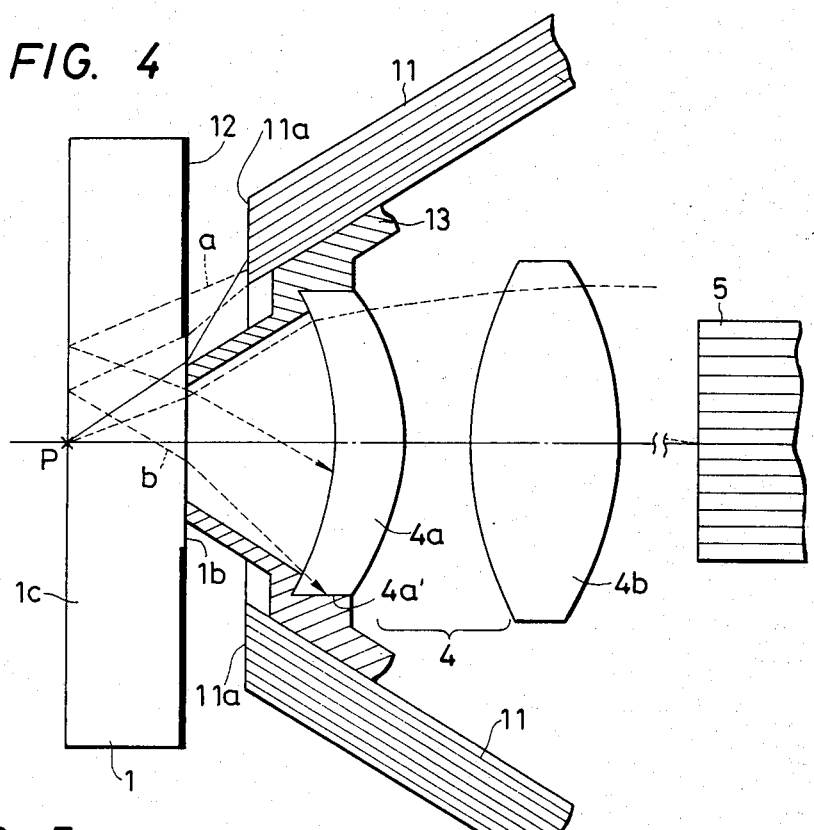
FIG. 4 is a sectioned schematic view of an embodiment of the illuminating optical system for high magnification endoscopes according to the present invention.

The present invention shall be explained in detail in the following on the basis of the embodiment shown in FIG. 4.

In the drawings, reference numeral 1 represents a cover glass having, on the objective side surface 1b thereof, a stop 12 provided with an opening formed centrally thereof. On the inner side of this cover glass, there are provided, on the same optical axis, an objective lens generally indicated at 4 which is comprised of a front group lens 4a held by a supporting frame 13 and having, on the outer peripheral surface thereof, a coating layer 4a' intended to cut a reflecting light, and further comprised of a rear group lens 4b (part of which is not illustrated), and an image guide fiber bundle 5 intended to receive, at its light-incident surface (i.e. its light-entrance end), the image of an object formed by said objective lens 4 and to transmit this image to its other end. The supporting frame 13 extends, in a tapering fashion, toward the cover glass 1, and its foremost end abuts a transparent portion located within the opening of the stop 12 on the objective side surface 1b of the cover glass. A light guide fiber bundle 1 for illumination is disposed in a tapered annular form on the circumference of the supporting frame 13. The light-emitting end of this light guide fiber bundle 11 is arranged substantially in parallel with the surface of the cover glass 1.

The high magnification endoscope according to the present invention is constructed as described above. Accordingly, the illumination light emitted from the light guide 11 is refracted toward the optical axis of the objective lens 4 for an amount corresponding to the amount of inclination of the light-emitting end 11a thereof toward the direction of axis of the fiber bundle. Thus, the light enters, as being refracted, into the cover glass 1 through the transparent gap defined by the stop 12 and the extension of the supporting frame 13, and it reaches the vicinity of the optical axis at the object side surface 1c of the cover glass 1 to thereby illuminate an object point P which is located either exactly on the object side surface 1c of the cover glass 1 or near it.

On the other hand, among the illumination light emitting from the light guide 11, the portion a of light which emits toward a position on the object side surface 1c of the cover glass 1 which departs relatively from the optical axis has been preliminarily blocked by the stopper 12, and accordingly there develops no flare attributable to such type of light. Also, the light b which emits from the proximal margin of the light-emitting surface 11a of the light guide 11 and passes near the proximal margin of the stop 12 and reflects from the object side surface 1c of the cover glass 1 at a position relatively close to the optical axis is blocked by the coating layer 4a' of the front group lens 4a of the objective lens 4. Since the foremost end of the supporting frame 13 extends up to the objective side surface 1b of the cover glass 1, there exists no light which is reflected at the object side surface 1c and enters into the objective lens system. Thus, the extension of the frame 13 serves as a light-blocking member.

As discussed above, in this embodiment, it should be noted that, by providing a stop of an appropriate size on the objective side surface of the cover glass and by extending the supporting frame up to the cover glass, it is possible to prevent the intrusion of flare lights into the observation system.

Also, in the instant embodiment, there exists no reflecting surface in the path of the illuminating light, and therefore there takes place no loss of the illuminating light, and thus a sufficiently bright illumination is feasible. Especially, in this embodiment, it should be noted that, between the object side surface 1b of the cover glass and the light-emitting surface 11a of the light guide, the path of the illuminating light inclines substantially relative to the optical axis due to the refracting action, and accordingly even when the light-emitting end surface 11a is brought closer to the cover glass, it is still possible to provide a large diameter by the circular ring which is defined by the proximal margin of the light-emitting end surface 11a. For this reason, it is possible to bring the light-emitting surface close to the cover glass without its becoming an obstruction for the objective lens system, thus making it possible to improve the density of the amount of the illumination light, whereby leading to the feasibility of providing a brighter illumination.

Now, to what degree this embodiment has improved in the light amount as compared with the conventional example shall be considered.

Generally, the illumination S on the image surface is defined as follows in the case of the endoscope:

$$S = \tau \pi L_0 (\sin^2 \psi / \beta^2) \quad (1)$$
$$= \tau \pi L_0 \cdot \frac{1}{\beta^2} \cdot \frac{4}{F^2}$$

where $\tau$ represents a permeability of the image guide, $L_0$ represents a brightness of the object, $\sin \psi$ represents a number of apertures of the objective system, $\beta$ represents a photographing magnification of the eyepiece and F represents an F-number. On the brightness $L_0$ of the object, there is a relative formula $$L_0 \propto I/D^2 \quad (2)$$

where I represents an intensity of the light guide light and D represents a distance between the object point and light guide. Therefore, from the formulae (1) and (2), $$S \propto I/D^2 \cdot 1/\beta^2 \cdot 1/F^2 \quad (3)$$

Figure 1:
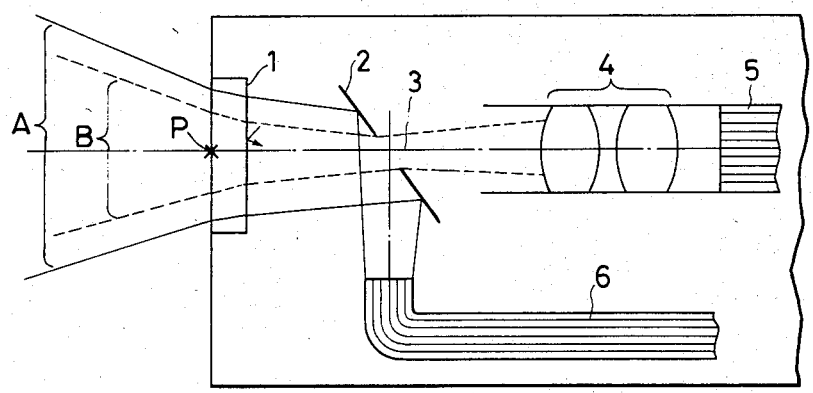
FIGS. 1 to 3 are sectioned schematic views of the respective tip parts of conventional endoscopes.
Figure 2:
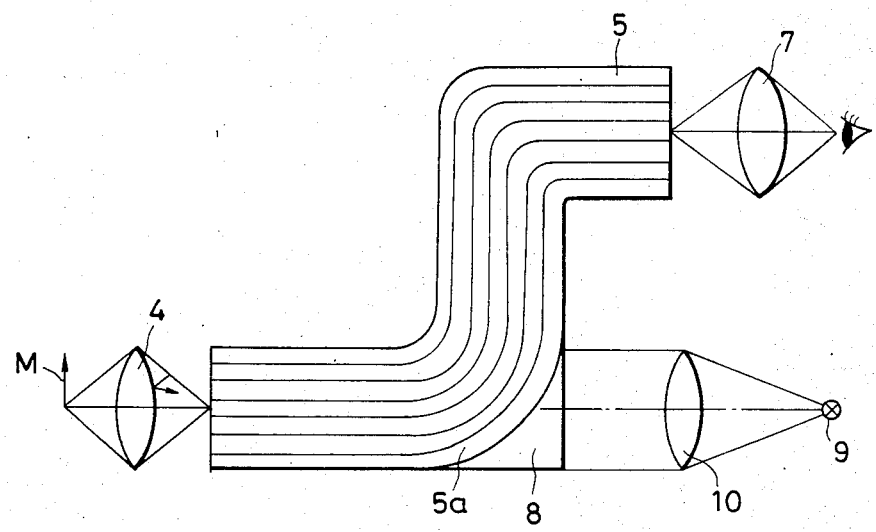
Figure 3:
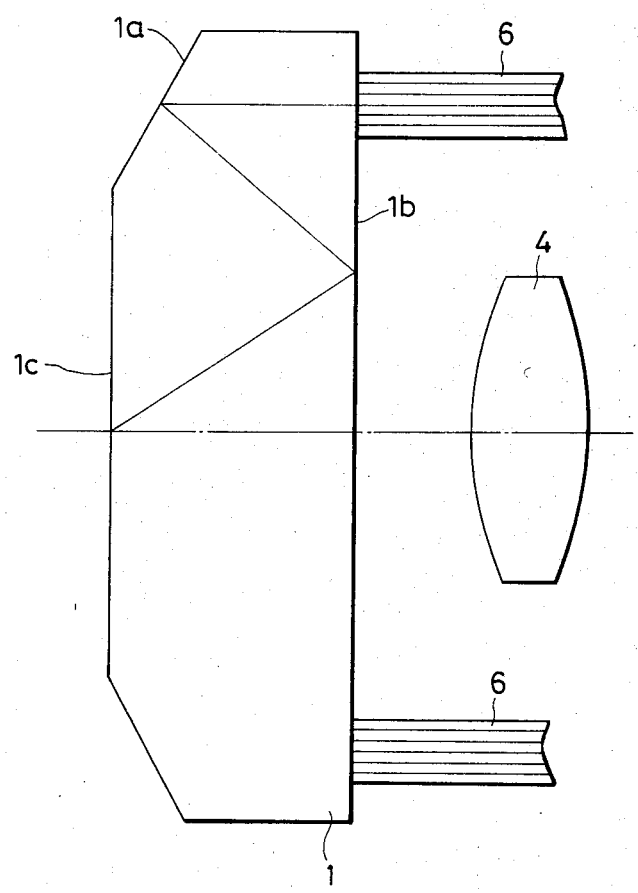
Figure 5:
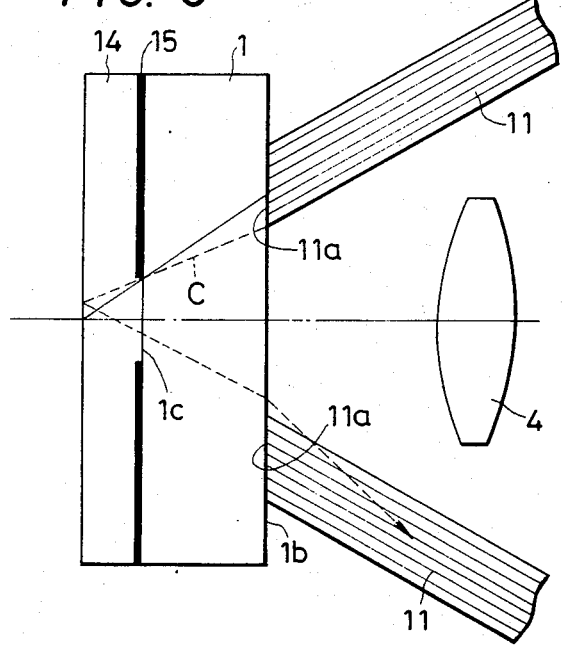
FIG. 5 is a sectioned schematic view of another embodiment.

Now, if the conventional example and this embodiment are equal to each other in the intensity I and magnification $\beta$, the remaining factors will be the distance D, F-number F and the size of the loss by the Fresnel's reflection. In the conventional example shown in FIG. 3, $D \approx 3.8$ (air converted light path length), $F \approx 20$ and the loss by the Fresnel's reflection is 16%, whereas, in this embodiment, $D \approx 1.6$, $F \approx 27$ and the loss by the Fresnel's reflection if 4%. Therefore, if the above formula (3) is calculated by applying these values, it will be found that, in this embodiment, the light amount increase to be more than 3 times as large as in the conventional example shown in FIG. 3 is secured and the object is well attained. FIG. 5 shows another embodiment of the present invention. In this embodiment, the exit end face 11a of the light guide 11 is in close contact with the objective side surface 1b. In this case, another cover glass 14 is cemented to the object side surface 1c of the cover glass 1 and a stop 15 is provided, setting the diameter of the stopper 15 so as to insure that the light c which has emitted at the proximal margin of the light-emitting (i.e. exit) end 11a and passed through the proximal margin of the stop 15 and reflected at the object side surface of the cover glass 14 will not enter into the objective lens, flare is inhibited from developing.

It should be understood here that there is the potential problem that the illumination light is reflected also at the interface between the cover glass 14 and the cover glass 1. However, by, for example, cementing the cover glass 14 closely to the cover glass 1 both having the same quality ($n_1 = n_{14}$... equal refractive index), or by cementing these two cover glasses together with a cementing agent having a refractive index $n_c$ of $n_1 = n_c = n_{14}$, the reflection at this interface can be reduced to a negligible extent, so that there arises no problem of flare.

It should be understood here that, in case the objective lens 4 is disposed at a position closer to the cover glass, there is the possibility that the light c enters into the circumferential region of the objective lens. In such a case also, it is only necessary to provide a flare-cutting cover layer on the circumferential surface of this lens in the same way as in the first embodiment.

As will be apparent from the above-described two embodiments, according to the present invention, there is provided an illuminating light guide in a tapered fashion around the observation system, and also there is provided, in the path of light through which the illuminating light reaches the object, a stop having a central opening of an appropriate size, whereby the occurrence of flare is prohibited, making a satisfactory observation feasible. Also, because there is no reflecting surface in the path of illuminating light, it is possible to secure a sufficient brightness of illumination.

As described above, the illuminating optical system for high magnification endoscopes according to the present invention has practically important advantages that the light amount can be better secured than in the conventional example and that the flare light does not enter the observing system.

What is claimed is:

1. An illuminating optical system for high magnification endoscopes, comprising:
    an observation optical system;
    a cover glass disposed on the light incident side of said observation optical system;
    a light guide disposed around said observation optical system in an annular form tapering toward said cover glass; and
    a flare stop defining a predetermined opening and disposed between a light-emitting end of said light guide and an object side surface of said cover glass and having a diameter arranged so that light emitted from an innermost end of said light guide and passing through the a peripheral edge of said opening is led out of said observation optical system after being reflected by the object side surface of said cover glass.

2. An illuminating optical system according claim 1, wherein:
    said light-emitting end of said light guide is spaced from and substantially in parallel with said cover glass.

3. An illuminating optical system according to claim 2, wherein:
    said observation optical system comprises an objective lens including a front group lens and a rear group lens, and wherein:
    a coating layer for cutting a reflecting light is provided on the circumferential surface of said front group lens.

4. An illuminating optical system according to claim 3, wherein:
    a light-blocking member extends from said objective lens up to said cover glass.

5. An illuminating optical system according to claim 1, wherein:
    said light-emitting end of said light guide is in close contact with a surface of said cover glass, and
    said stop is provided within said cover glass.

6. An illuminating optical system according to claim 5, wherein:
    said observation optical system comprises an objective lens including a front group lens and a rear group lens, and wherein:
    a coating layer for cutting a reflecting light is provided on the circumferential surface of said front group lens.

7. An illuminating optical system for high magnification endoscopes, comprising:
    an observation optical system, said observation optical system comprising an objective lens including a front group lens and a rear group lens, a coating layer for cutting a reflecting light being provided on the circumferential surface of said front group lens;
    a cover glass disposed on the light incident side of said observation optical system; and
    a light guide disposed around said observation optical system in an annular form tapering toward said cover glass,
    wherein a flare stop defining a predetermined opening is provided at said cover glass.

8. An illuminating optical system according to claim 7, wherein:
    a light-blocking member extends from said objective lens up to said cover glass.

9. An illuminating optical system for high magnification endoscopes, comprising:
    an observation optical system, said observation optical system comprising an objective lens including a front group lens and a rear group lens, a coating layer for cutting a reflecting light being provided on the circumferential surface of said front group lens;
    a cover glass disposed on the light incident side of said observation optical system; and
    a light guide disposed around said observation optical system in an annular form tapering toward said cover glass, the light-emitting end of said light guide being in close contact with a surface of said cover glass,
    wherein a flare stop defining a predetermined opening is provided at said cover glass, said stop being provided within said cover glass.

* * * * *